(12) United States Patent
Cheon et al.

(10) Patent No.: US 8,898,588 B2
(45) Date of Patent: Nov. 25, 2014

(54) METHOD FOR PROVIDING USER INTERFACE FOR EACH USER AND DEVICE APPLYING THE SAME

(75) Inventors: Ka-won Cheon, Seoul (KR); Pil-seung Yang, Suwon-si (KR); Yeo-jun Yoon, Suwon-si (KR); Kuk-hyun Han, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 12/990,440

(22) PCT Filed: Jun. 3, 2010

(86) PCT No.: PCT/KR2010/003573
§ 371 (c)(1),
(2), (4) Date: May 11, 2011

(87) PCT Pub. No.: WO2010/140849
PCT Pub. Date: Dec. 9, 2010

(65) Prior Publication Data
US 2011/0231795 A1 Sep. 22, 2011

(30) Foreign Application Priority Data

Jun. 5, 2009 (KR) .................. 10-2009-0049798
Jun. 25, 2009 (KR) .................. 10-2009-0057214

(51) Int. Cl.
| | | |
|---|---|---|
| *G06F 15/00* | (2006.01) | |
| *G06F 13/00* | (2006.01) | |
| *G06F 1/32* | (2006.01) | |
| *G06F 3/0488* | (2013.01) | |
| *G09G 5/14* | (2006.01) | |

(52) U.S. Cl.
CPC ........ *G06F 3/04886* (2013.01); *G09G 2354/00* (2013.01); *Y02B 60/1289* (2013.01); *G09G 5/14* (2013.01); *G06F 1/3231* (2013.01)
USPC ........................................... 715/784; 715/747

(58) Field of Classification Search
CPC .................... G06F 3/04817; G06F 3/04886
USPC ......... 715/780, 759, 792, 863, 784, 763–765, 715/722, 744, 747
See application file for complete search history.

(56) References Cited

U.S. PATENT DOCUMENTS 8,432,365 B2 * 4/2013 Kim et al. ..................... 345/173
2002/0101418 A1 8/2002 Vernier et al.

(Continued)

FOREIGN PATENT DOCUMENTS

| CN | 101237637 | 8/2008 |
|---|---|---|
| EP | 2 000 997 | 12/2008 |
| JP | 2004-258766 | 9/2004 |

(Continued)

OTHER PUBLICATIONS

Paul Dietz et al.: "Diamond Touch: A Multi-User Touch Technology", pp. 219-226, 2001.
Chinese Office Action dated Jun. 3, 2014 issued in counterpart application No. 201080024576.1.

*Primary Examiner* — Kevin Nguyen
(74) *Attorney, Agent, or Firm* — The Farrell Law Firm, P.C.

(57) ABSTRACT

A method for providing a user interface (UI) for each user and a device applying the same are provided. The method displays an icon indicating that a user has approached, if the user approaches an approach recognition area, and displays a personalized area allocated to the user, if a manipulation to select the icon is input. Accordingly, the user uses the device simply by approaching the device without going through an extra log-in process, so that the user can use the device more easily.

16 Claims, 16 Drawing Sheets

(56) References Cited

U.S. PATENT DOCUMENTS

| | | |
|---|---|---|
| 2006/0294247 A1 | 12/2006 | Hinckley et al. |
| 2007/0220444 A1 | 9/2007 | Sunday et al. |
| 2007/0266185 A1 | 11/2007 | Goddi et al. |
| 2008/0192059 A1* | 8/2008 | Kennedy .................. 345/537 |
| 2009/0084612 A1 | 4/2009 | Mattice et al. |
| 2009/0085877 A1 | 4/2009 | Chang et al. |
| 2009/0094561 A1* | 4/2009 | Do et al. .................. 715/863 |
| 2011/0187675 A1* | 8/2011 | Nakai et al. .................. 345/174 |

FOREIGN PATENT DOCUMENTS

| | | |
|---|---|---|
| JP | 2006-048139 | 2/2006 |
| JP | 2007-272927 | 10/2007 |
| JP | 2008-269044 | 11/2008 |

* cited by examiner

METHOD FOR PROVIDING USER INTERFACE FOR EACH USER AND DEVICE APPLYING THE SAME

PRIORITY

This application is a National Stage of International Application No. PCT/KR2010/003573, filed Jun. 3, 2010, and claims priority from Korean Patent Application Nos. 2009-0049798 and 2009-0057214 filed on Jun. 5, 2009 and Jun. 25, 2009, respectively, in the Korean Intellectual Property Office, the entirety of the disclosure of each are incorporated by reference herein.

FIELD OF THE INVENTION

The present invention generally relates to a method for providing a User Interface (UI) and, more particularly, to a method for providing a UI suitable for recognizing a user's approach and a device applying the same.

BACKGROUND OF THE INVENTION

With the development of communication technologies, an environment where various devices are interconnected via a communication network and provide their respective services to a user is established. For example, home and office network systems are well established, and ubiquitous city business networks are being established.

A device included in such a network environment is likely to be shared by several users, rather than being used by only one user. Therefore, a user should go through a user authentication process in order to use a specific device.

However, since the user should go through a process of inputting an ID and a password every time he or she wishes to log in, there is inconvenience in starting use of the device. Also, when the user wishes to use files stored in his or her computer using another device, the user should go through a process of accessing the computer and then copying the files stored in the computer, which also may cause inconvenience.

The user wishes to access various devices in a network environment by performing a simple process. Therefore, there is a need for a method for a user to use devices connected to a network environment more easily.

SUMMARY

An exemplary embodiment of the present invention provides a method for providing a User Interface (UI) for each user that displays an icon indicating that a user has approached on a screen, if user's approach within an approach recognition area is detected, and displays a personalized area, which is a screen area allocated to the user, if a manipulation to select the icon is input, and a device applying the same.

An exemplary embodiment of the present invention also provides a method for providing a UI for each user, which displays a specific icon on a screen, if user's approach within an approach recognition area is detected, and, if user moves from one position to another position, moves the specific icon on the screen according to the position to which the user has moved.

According to an aspect of the present invention, there is provided a method for providing a UI for each user of a device including a display, the method including detecting whether a user approaches an approach recognition area, if the user approaches the approach recognition area, displaying an icon indicating that the user has approached, and if a manipulation to select the icon is input, displaying a personalized area which is a screen area allocated to the user.

The detecting may include detecting an approaching direction of the user, while detecting whether the user approaches the approach recognition area.

The displaying of the icon may include displaying the icon on a screen area corresponding to the approaching direction of the user.

The displaying of the personalized area may include displaying the personalized area on a screen area corresponding to the approaching direction of the user.

The detecting may include detecting user information, while detecting whether the user approaches the approach recognition area.

The detecting may include detecting user information using an ID card and biometric authentication of the user.

The user information may include at least one of a user's ID, password, name, and photo, and the displaying the icon may include displaying at least one of the user information along with the icon.

The method may further include, if the user moves from one position to another position, moving the icon or the personalized area on a screen according to the position to which the user has moved.

The moving may include moving the icon or the personalized area such that a lower end of the icon or the personalized area is oriented toward an outside of the screen when the icon or the personalized area is being moved to the position to which the user has moved.

The method may further include, if the user moves to an external apparatus communicably connected to the device via a wired or wireless communication module, transmitting information regarding the icon or the personalized area to the external apparatus.

The method may further include, if the detection of the user's approach is terminated while the icon or the personalized is being displayed, controlling the icon or the personalized area to disappear.

According to an aspect of the present invention, there is provided a device, including an approach recognition unit which detects whether a user approaches an approach recognition area, a manipulation unit which receives a user's manipulation, a display unit which displays an input image, and a controller which, if the user approaches the approach recognition area, controls the display unit to display an icon indicating that the user has approached, and, if a manipulation to select the icon is input through the manipulation unit, controls the display unit to display a personalized area, which is a screen area allocated to the user.

According to an aspect of the present invention, there is provided a method for providing a UI for each user of a device comprising a display, the method including detecting whether a user approaches an approach recognition area, displaying a specific icon, if the user approaches the approach recognition area, detecting a user's movement within the approach recognition area, and if the user's movement is detected, moving the icon on a screen according to the user's movement.

The moving may include moving the icon such that a lower end of the icon is oriented toward an outside of the screen while the icon is being moved according to the user's movement.

The device may include a plurality of surfaces, and the detecting may include detecting whether a plurality of users approach an approach recognition area of one of the plurality of surfaces. The displaying the icon may include displaying a plurality of icons for the plurality of users on the screen.

The displaying the personalized area may include, if a manipulation to select one of the plurality of icons is input, displaying a personalized area corresponding to the selected icon.

According to the various exemplary embodiments, the icon indicating that the user has approached is displayed on the screen, if the user approach within the approach recognition area is detected, and if the manipulation to select the icon is input, the personalized area allocated to the user is displayed. Therefore, the user is able to use devices connected to a network environment more easily. In particular, the user is able to use the device simply by approaching the device without going through an extra log-in process, so that the user can use the device very easily.

BRIEF DESCRIPTION OF THE DRAWINGS

The above and/or other aspects of the invention will become and more readily appreciated from the following description of the exemplary embodiments, taken in conjunction with the accompanying drawings of which.

DETAILED DESCRIPTION OF EXEMPLARY EMBODIMENTS OF THE INVENTION

Figure 1:
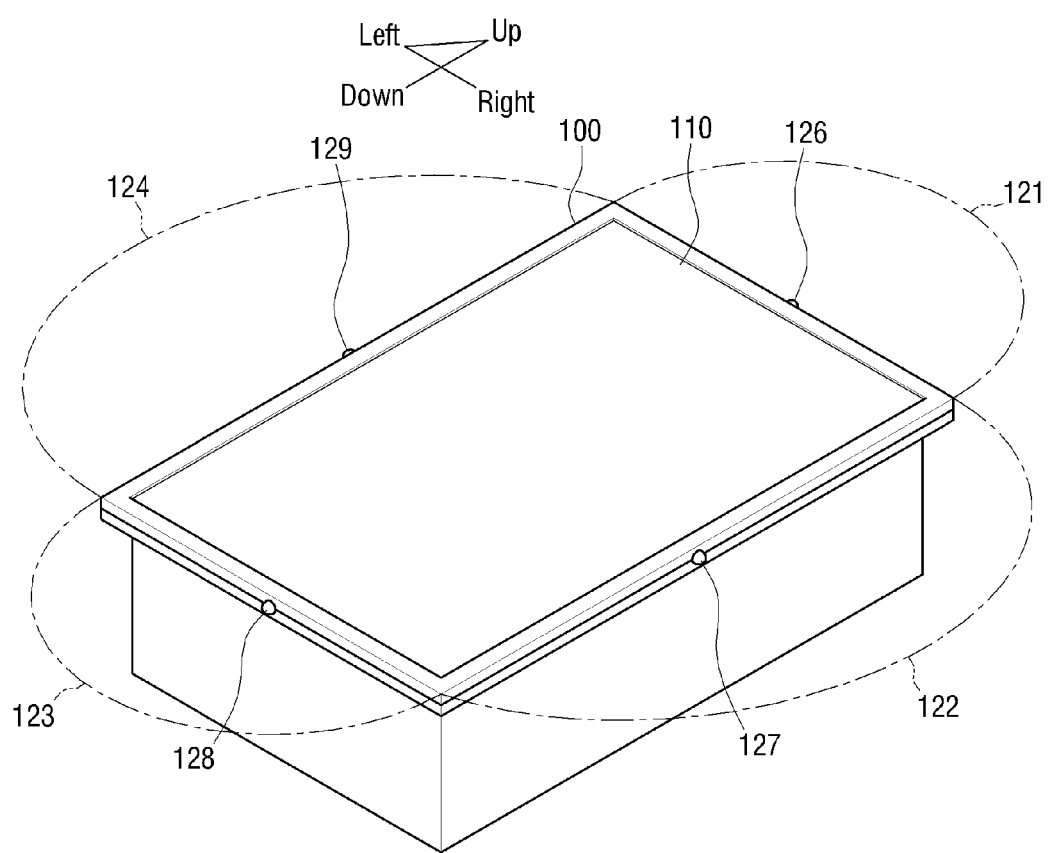
FIG. 1 is a schematic view illustrating a table top according to an exemplary embodiment.

Reference will now be made in detail to the present exemplary embodiments of the present invention, examples of which are illustrated in the accompanying drawings, wherein like reference numerals refer to the like elements throughout. The exemplary embodiments are described below in order to explain the present invention by referring to the figures.

As shown in FIG. 1, the table top 100 is a computer device realized in the form of a table and a display 100 is mounted on an upper plate of the table.

The table top 100 recognizes whether a user approaches an approach recognition area using an approach recognition unit. The table top 100 preferably has a rectangular shape having four sides. Therefore, as shown in FIG. 1, the approach recognition unit includes a first approach recognition sensor 126, a second approach recognition sensor 127, a third approach recognition sensor 128, and a fourth approach recognition sensor 129, which are arranged on a respective side thereof.

The table top 100 recognizes whether the user approaches a first area 121, a second area 122, a third area 123, and a fourth area 124, indicating approach to each of the four sides. For example, the first to the fourth approach recognition areas 121-124 range from 1 m to 1.5 m from a center point of each side. In other words, the approach recognition area refers to an area at which the table top 100 recognizes the user's approach, and includes the first to the fourth areas 121-124 in FIG. 1.

In this application, the first area 121 is defined as having an upper orientation, the second area 122 is defined as having a rightward orientation, the third area 123 is defined as having a lower orientation, and the fourth area 124 is defined as having a left orientation.

Approach of a user to the first area 121 is detected by the first approach recognition sensor 126, user approach to the second area 122 is detected by the second approach recognition sensor 127, user approach to the third area 123 is detected by the third approach recognition sensor 128, and user approach to the fourth area 124 is detected by the fourth approach recognition sensor 129.

The table top 100 recognizes user approach using various types of approach recognition units. The approach recognition unit preferably includes an ID card reader, a wireless communication module, and a biometric sensor. For example, if the user places his or her ID card on an ID card reader, the table top 100 recognizes user's approach via the ID card reader. Also, if the user carries the ID card, the table top 100 may detect the user's ID card through wireless communication such as radio frequency (RF), Zigbee®, or Bluetooth'. Also, the table top may recognize a user approach using a biometric sensor using a biometric authentication process of recognizing user voice, cornea, face or finger print. Also, the table top 100 may recognize who the user is by recognizing user's ID card or user's voice, cornea, face or finger print.

Also, the table top 100 may recognize a direction from which the user approaches the table top 100. For example, the table top 100 of FIG. 1 has four sides since the table top 100 has a rectangular shape. Therefore, the table top 100 may recognize which side of the four sides the user approaches.

To achieve this, the table top 100 may include the approach recognition sensors arranged on each of the four sides. For example, the table top 100 of FIG. 1 may include four approach recognition sensors arranged on upper, lower, left, and right sides, as described therein. The table top 100 may compare magnitudes of signals detected by the approach recognition sensors and recognizes user's approaches at a side from which the strongest signal is detected.

As described above, the table top 100 recognizes whether the user approaches and recognizes in which direction the user approaches using the approach recognition unit.

Hereinafter, an operation of the table top 100 if the user approaches will be explained with reference to FIGS. 2 to 6.

Figure 2:
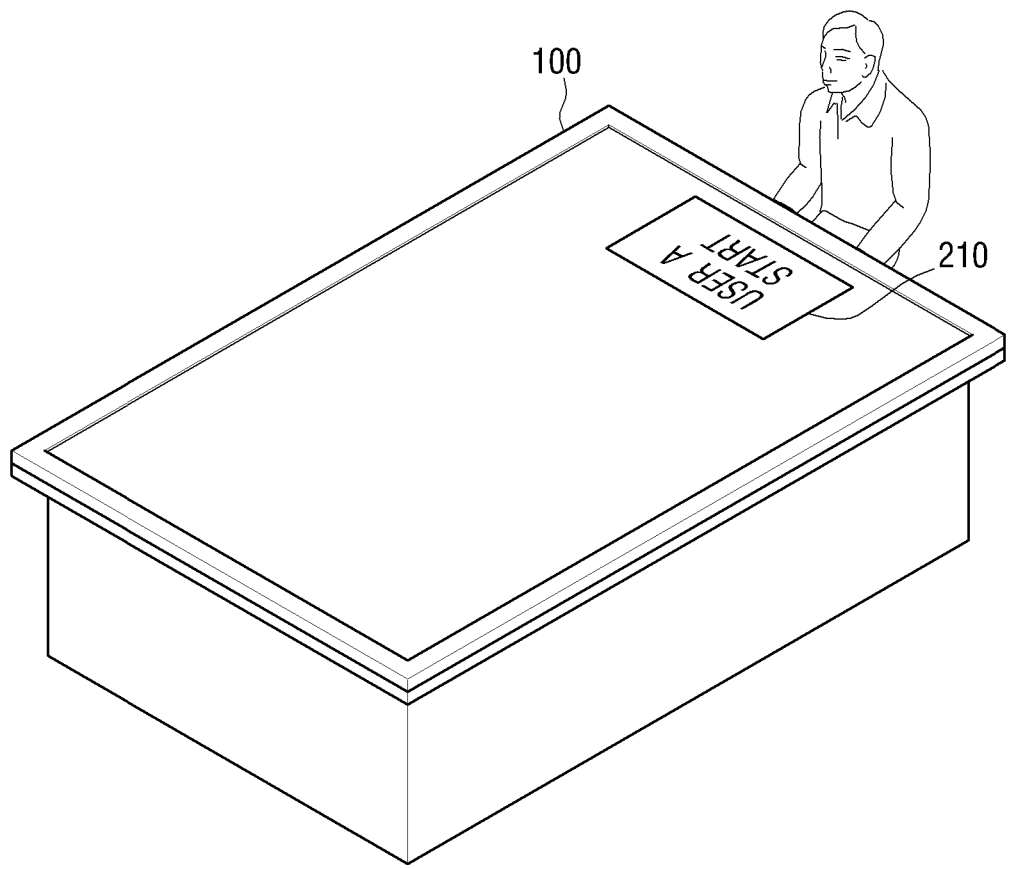
FIG. 2 is view illustrating a user approach recognition icon displayed on a table top, if the table top recognizes user's approach and also recognizes user information, according to an exemplary embodiment.

As shown in FIG. 2, if the user approaches the upper side of the table top 100, the table top 100 recognizes that the user has approached the upper side and displays the user approach recognition icon 210 on an upper portion of the screen.

Also, the table top 100 may recognize user information along with the user's approach. As shown in FIG. 2, "USER A" is written on the user approach recognition icon 210 displayed on the screen of the table top 100. In other words, the table top 100 recognizes that a specific user, i.e. user "A", has approached.

The user information recited herein refers to information regarding a user and includes at least one of user's ID, password, name, and photo.

The user approach recognition icon 210 refers to an icon that is displayed on the screen to represent that the table top 100 has recognized that the user approached the table top 100. If the user selects the user approach recognition icon 210 displayed on the screen, the table top 100 determines that the user has approached in order to use the table top 100. In other words, the table top 100 discriminates between an intended approach having an intention to use the table top 100 and an accidental approach having no intention to use the table top 100, using the user approach recognition icon 210.

The user approach recognition icon 210 is displayed as an icon on a Graphic User Interface (GUI) and displayed along with at least one piece of user information. For example, the user approach recognition icon 210 is displayed along with at least one of user's ID, name, and photo image.

On the other hand, if the table top 100 is not able to identify the user, the table top 100 recognizes the user as a guest, as explained with reference to FIG. 3.

Figure 3:
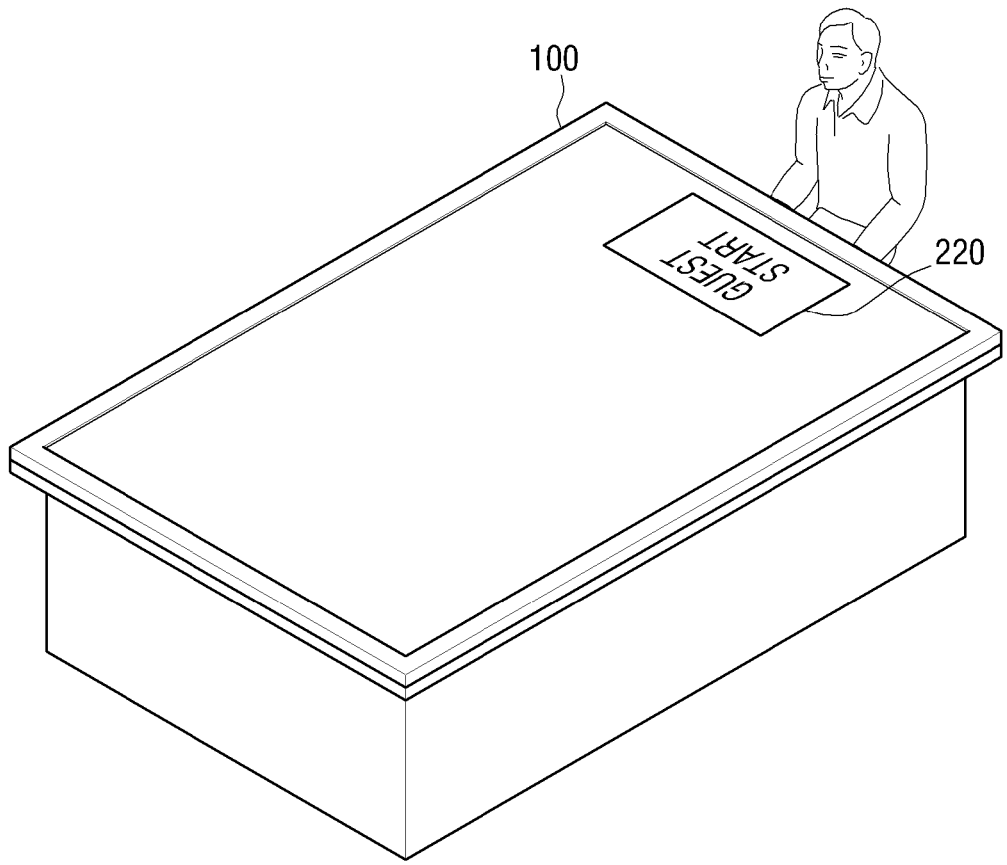
FIG. 3 is a view illustrating a user approach recognition icon displayed on a table top, if the table tope recognizes user's approach but does not recognize user information, according to an exemplary embodiment.

As shown in FIG. 3, if the table top 100 recognizes user's approach only but does not recognize user information, "GUEST" is displayed on the user approach recognition icon 220.

Also, if the table top 100 does not recognize the user information, the table top 100 may receive the user information directly from the user. Specifically, if the table top 100 does not recognize the user information, the table top 100 displays a user information input screen. If user information is input by the user, the table opt 100 stores the input user information and displays an input user's ID on the user approach recognition icon 220.

Figure 4:
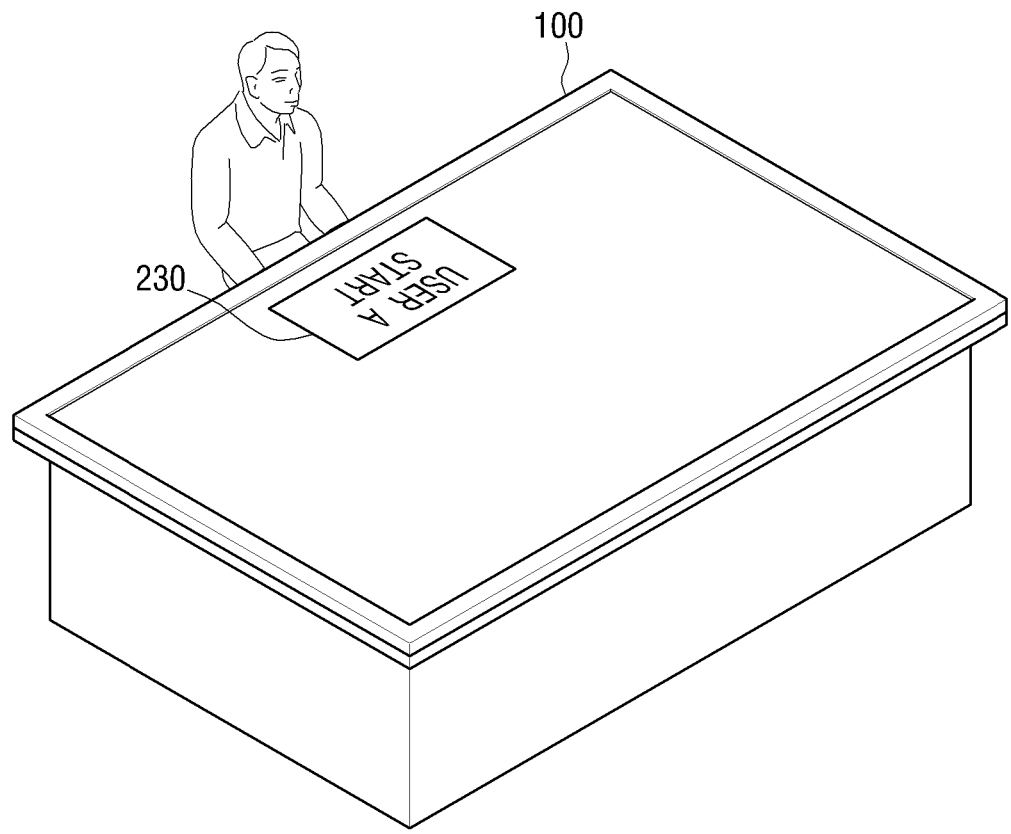
FIG. 4 is a view illustrating a user approach recognition icon displayed on table top, if a user approaches a left side of the table top, according to an exemplary embodiment.

Also, the user approach recognition icon 220 may be displayed in various positions, as further explained with reference to FIG. 4. FIG. 4 is a view illustrating a user approach recognition icon 230 displayed, if the user approaches a left side of the table top 100.

As shown in FIG. 4, the table top 100 displays the user approach recognition icon 230 in a different position according to a direction in which the user approaches. In other words, the table top 100 displays the user approach recognition icon 230 on a screen area facing the approaching direction of the user. The user approach recognition icon 230 is displayed on the screen area close to the position from which the user has approached, so that the user can easily recognize the user approach recognition icon 230.

Accordingly, as shown in FIG. 4, if the user approaches the left side of the table top 100, the user approach recognition icon 230 is displayed on the left portion of the screen.

As described above, the table top 100 displays the user approach recognition icon on a portion close to the approaching direction of the user. Therefore, the user is able to recognize intuitively that the user approach recognition icon is displayed due to his or her approach.

In this embodiment, the table top 100 displays the user approach recognition icon 230 in order to inform of the user's approach. However, other methods to inform of the user's approach may be used, such as by use of a light emitting element or a sound. The light emitting element serving to inform of the user's approach will be explained below with reference to FIG. 5.

Figure 5:
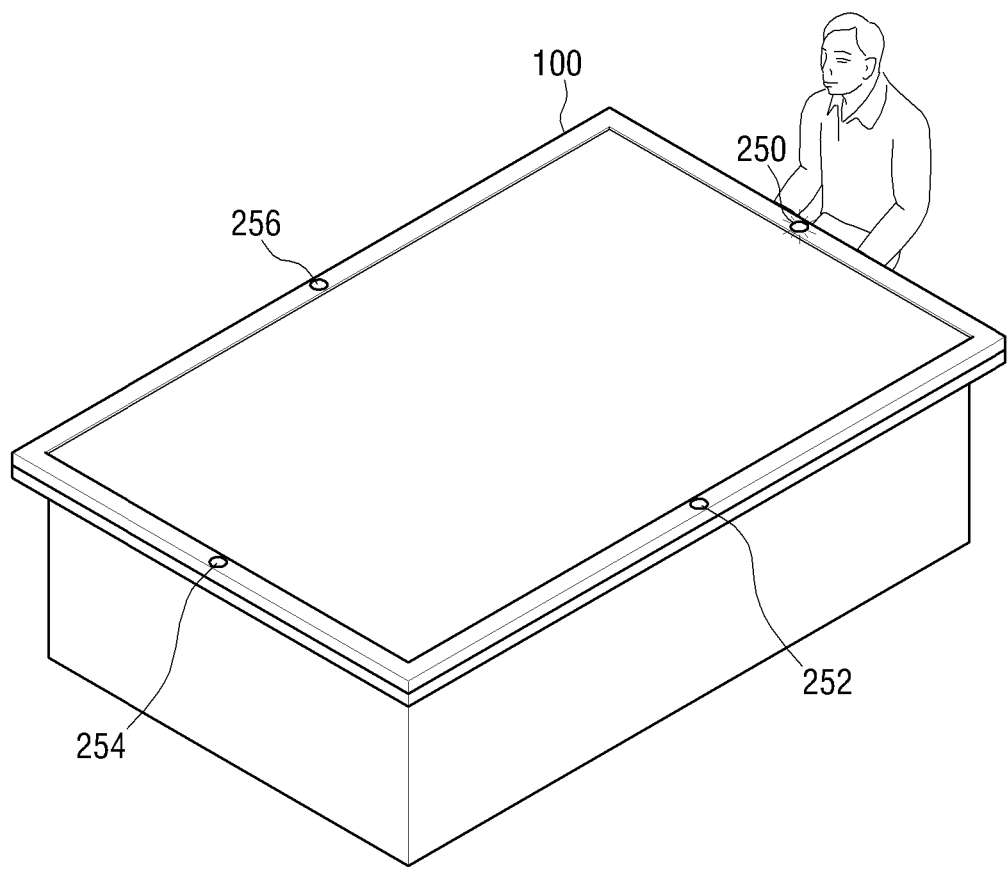
FIG. 5 is a view illustrating a table top which has a light emitting element for alarming a user's approach according to another exemplary embodiment.

As shown in FIG. 5, the table top 100 includes a first light emitting element 250, a second light emitting element 252, a third light emitting element 254, and a fourth light emitting element 256, which are arranged on each of side surfaces of the table top 100.

If the user approaches the table top 100, the table top 100 controls a light emitting element on a surface from which user's approach is detected to emit light. In FIG. 5, since the user approaches the upper side of the table top 100, the table top 100 controls the first light emitting element 250 arranged on the upper side surface to emit light.

As described above, the table top 100 is able to inform of recognition of the user's approach using the light emitting element.

Figure 6:
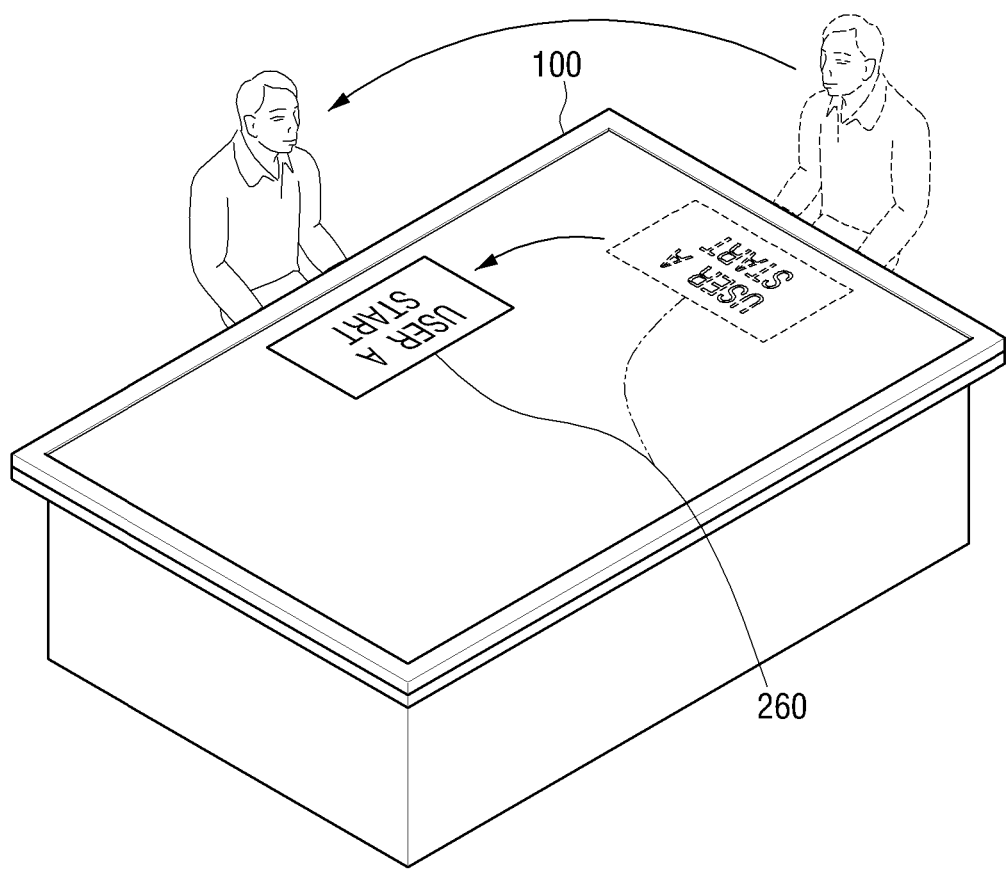
FIG. 6 is a view illustrating a user approach recognition icon which is moved on a table top, if a user moves from one position to another position, according to an exemplary embodiment.

As shown in FIG. 6, if the user stands up from the upper side of the table top 100 and moves to the left side, the user approach recognition icon 260 is moved from the upper portion of the screen to the left portion. In other words, if the user moves from one position to another position, the table top 100 will also move the user approach recognition icon 260 to a position to which the user has moved.

Also, the table top 100 moves the user approach recognition icon 260 such that a lower end of the user approach recognition icon 260 is oriented toward an outside of the screen while the user approach recognition icon 260 is being moved according to the position to which the user has moved. If the user approach recognition icon 260 is moved from the upper portion to the left portion on the screen as shown in FIG. 6, the orientation of the user approach recognition icon 260 on the screen changes from an upper direction to a left direction so that the lower end of the user approach recognition icon 260 is always oriented toward the outside of the screen. Therefore, wherever the user moves, the user is able to see the user approach recognition icon 260 being oriented in a normal direction, rather than having to view the approach recognition icon 260 in a reverse direction or a wrong direction.

As described above, since the table top 100 moves the user approach recognition icon 260 displayed on the screen according to the changed position of the user, the user is able to touch the user approach recognition icon 260 more easily.

Figure 7:
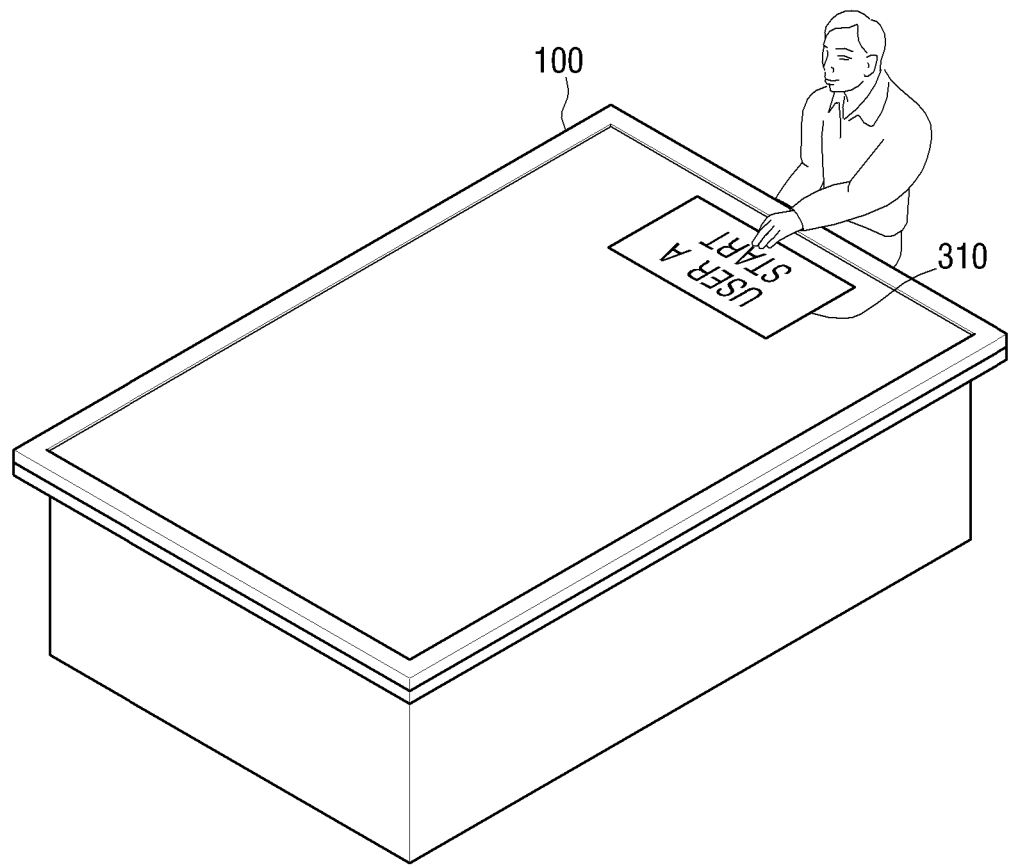
FIG. 7 shows a user touching a user approach recognition icon according to an exemplary embodiment.

Hereinafter, a personalized area will be explained with reference to FIGS. 7 to 9. As shown in FIG. 7, if the table top 100 displays the user approach recognition icon 310 to inform of the recognition of user approach, the user is able to use the table top 100 by selecting the user approach recognition icon 310 displayed on the screen. In other words, if the user selects the user approach recognition icon 310, the table top 100 displays a menu suitable for the user on the screen. For example, if the screen of the table top 100 is a touch screen, the user is able to start to use the table top 100 by touching the user approach recognition icon 310.

Figure 8:
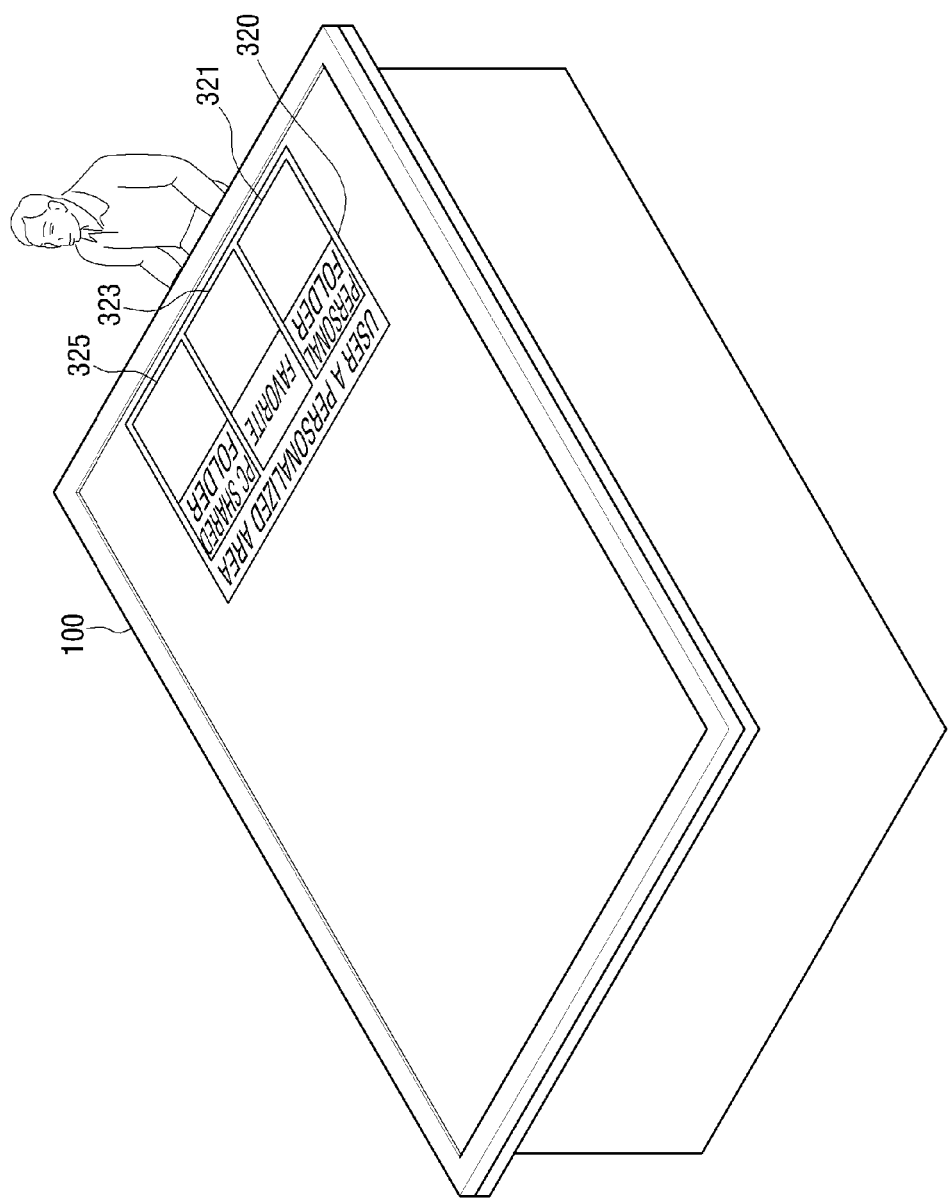
FIG. 8 is a view illustrating a personalized area which is displayed on a screen according to an exemplary embodiment.

As shown in FIG. 8, if the user touches the user approach recognition icon on the table top 100, the table top 100 displays the personalized area 320, which is a screen area usable by the user, on the screen. The table top 100 displays the personalized area 320 on a screen area corresponding to an approaching direction of the user. The table top 100 displays the personalized area 320 on the screen area close to the user so that the user can more easily use the personalized area 320.

The personalized area 320 refers to a screen area that is allocated to the user so that the user can user the personalized area 320 on the screen. Also, the remaining area of the screen of the table top 100, except for the personalized area 320, is a sharing area that is shared by all of the users. The personalized area 320 displays a menu suitable for private use of the user.

For example, the personalized area 320 displays user's personal folders stored in the table top 100, shared folders of a user's personal computer, a user's Internet blog, and a list of friends connected to the network.

Also, the personalized area 320 may automatically display an application having the highest rate of use in each time slot. In this case, the table top 100 determines which application is used by the user in each time slot, by referring to user's log with respect to each application. For example, if the user checks an e-mail on the table top 100 at 3 p.m. every Wednesday, the table top 100 displays an icon for executing a mail application on the personalized area 320 at 3 p.m.

In FIG. 8, the personalized area 320 displays menus of a personal folder 321, a favorite 323, and a PC shared folder 325. However, any other menu usable by the user can be displayed on the personalized area 320.

As described above, since the table top 100 displays the personalized area 320 for each user, the user is able to use his or her private area on the table top 100.

Figure 9:
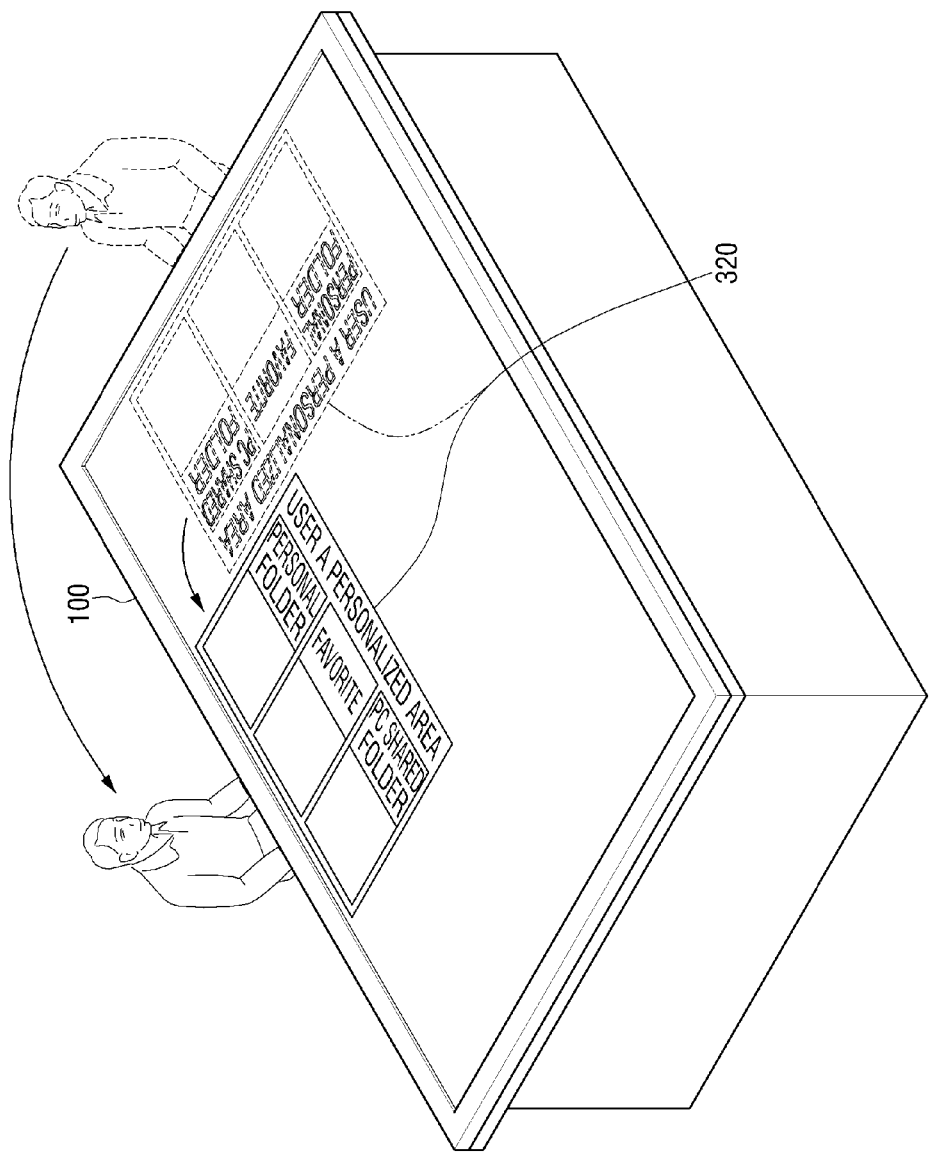
FIG. 9 is a view illustrating a personalized area which is moved, if a user moves from one position to another position, according to an exemplary embodiment.

As shown in FIG. 9, if the user stands at the upper side of the table top 100 and moves to the left side, the personalized area 320 also moves from the upper portion of the screen to the left portion. In other words, if the user moves from one position to another position, the table top 100 moves the personalized area 320 to the position to which the user has moved.

Also, the table top 100 moves the personalized area 320 such that a lower end of the personalized area 320 is oriented toward an outer edge of the screen while the personalized area 320 is being moved according to the position to which the user has moved. If the personalized area 320 is moved from the upper portion to the left portion on the screen as shown in FIG. 9, the orientation of the personalized area 320 on the screen changes from an upper direction to a left direction so that the lower end of the personalized area 320 is always oriented toward the outside of the screen. Therefore, wherever the user moves, the user is able to see the personalized area 320 being oriented in a normal direction rather than in a reverse direction or a wrong direction.

As described above, since the table top 100 moves the personalized area 320 according to the changed position of the user, the user is able to use the personalized area 320 more easily.

Hereinafter, a method of terminating the use of the table top 100 will be explained with reference to FIG. 10.

Figure 10:
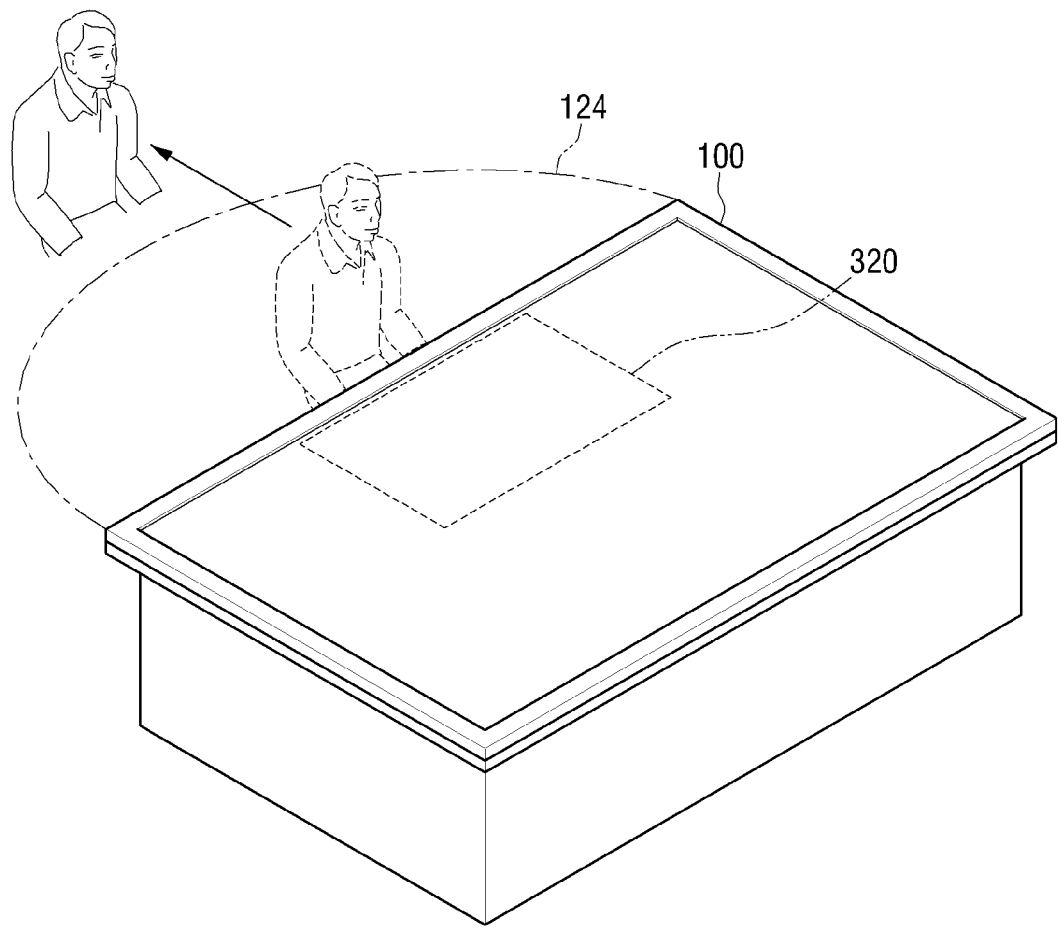
FIG. 10 shows that the personalized area disappears if a user leaves a fourth area of a table top.

As shown in FIG. 10, if the user leaves the fourth area 124, the approach recognition unit of the table top 100 no longer recognizes user's presence, determines that the user wishes to end the use of the table top 100, and the personalized area 320 disappears.

Also, when the user leaves the fourth area 124, the table top 100 preferably has a predetermined standby time. In other words, even if the user leaves the fourth area 124 but returns to the fourth area 124 within the standby time, the table top 100 continues displaying the personalized area 320 on the screen. On the other hand, if the standby time elapses after the user leaves the fourth area 124, the personalized area 320 disappears.

Even if the user leaves the fourth area 124, the table top 100 stores information regarding the personalized area 320 in a memory during the standby time. Accordingly, if the user re-approaches the fourth area 124 within the standby time, the table top 100 displays the personalized area 320 which has been used previously. Therefore, even if the user gets out of the fourth area 124 by mistake, the user is easily able to continue to use the table top 100.

In FIG. 10, only the fourth area 124 has been explained as an example of the approach recognition area. However, any other approach recognition area may be applied. For example, the first area 121, the second area 122, and the third area 123 of FIG. 1 may be applied.

Until now, the method for providing the UI for each user by recognizing the user's approach and providing the personalized area has been described with reference to FIGS. 1 to 10.

In the above embodiment, the table top 100 is used by one user. However, the table top 100 may be used by a plurality of users. In this case, the table top 100 allocates a personalized area to each user and displays the personalized area for each user, as explained with reference to FIG. 11.

Figure 11:
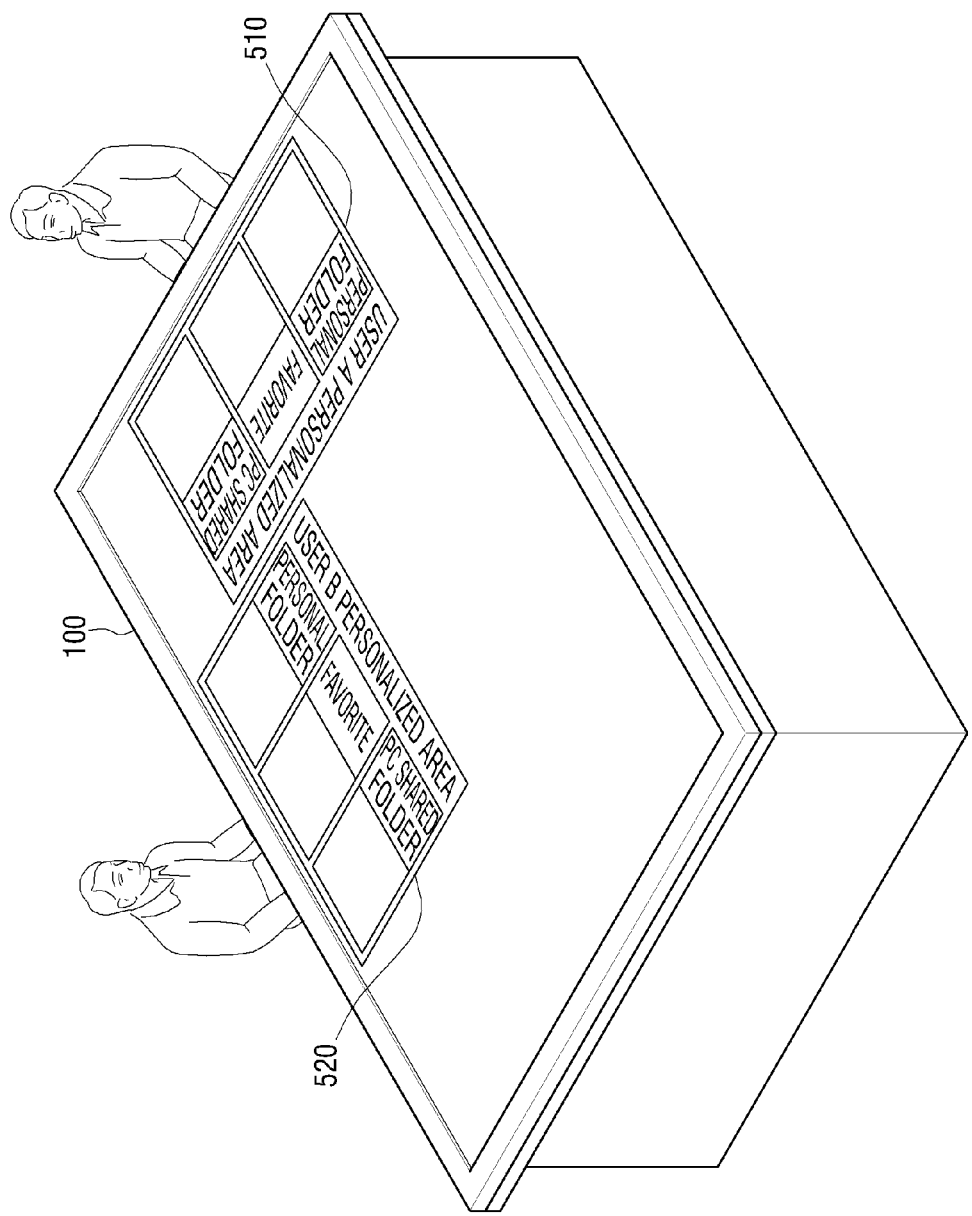
FIG. 11 is a view illustrating a table top being used by two users according to an exemplary embodiment.

As shown in FIG. 11, the table top 100 displays a personalized area 510 for a user ('A') and a personalized area 520 for another user ('B'), for use of the table top 100 by two or more users simultaneously. The table top 100 displays a user approach recognition icon and a personalized area for each user.

Also, the table top 100 may exchange users' data through the users' respective personalized areas. For example, if the user A drags a file displayed on his or her personalized area 510 into the personalized area 520 of the user B, the top table 100 may copy the file from the personalized area 510 of the user 'A' to the personalized area 520 of the user 13'.

In the above embodiment, one table top 100 is provided. However, two or more table tops communicably connected to each other may be applied, as explained with reference to FIG. 12.

Figure 12:
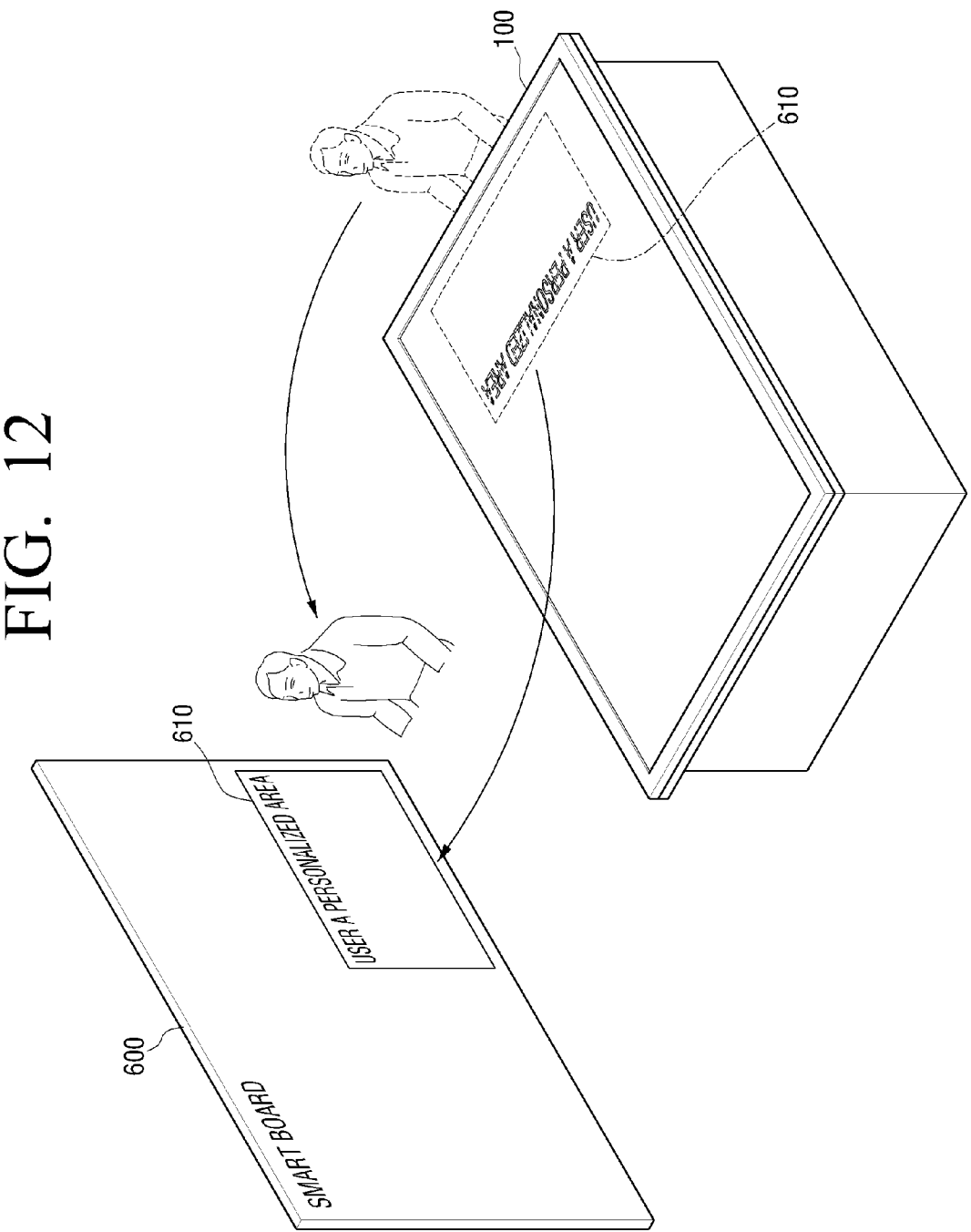
FIG. 12 is a view illustrating a smart board 600 and a table top 100 which cooperate with each other according to an exemplary embodiment.

As shown in FIG. 12, the smart board 600 and the table top 100 are communicably connected to each other via a wired or wireless communication module, with the smart board 600 also being capable of recognizing user approach.

If the user moves from the table top 100 to the smart board 600, the table top 100 transmits information regarding a user's personalized area 610 to the smart board 600. If the smart board 600 recognizes user's approach, the smart board 600 displays the personalized area 610 using the information regarding the user's personalized area 610 received from the table top 100.

As described above, the table top 100 cooperates with another device communicably connected thereto by transmitting information regarding a personalized area. Also, the table top 100 may cooperate with another device communicably connected thereto by transmitting not only the information regarding the personalized area but also information regarding a user approach recognition icon.

In the above embodiment, the table top 100 has a rectangular shape. However, the table top 100 may have any other shape such as a circular shape or a hexagonal shape. Also, the number of approach recognition sensors arranged on the table top 100 and the arrangement thereof are not limited.

Also, in the above embodiment, the table top 100 has been described as a device to which the present invention is applied. However, any device that can recognize user's approach and provide a personalized area can be applied. For example, the device may be a smart board or a TV, in addition to the table top 100.

Hereinafter, a method for providing a UI for each user of the device described above with reference to FIGS. 1 to 12 will be explained in detail with reference to FIG. 13.

The table top 100 determines whether a user approach is recognized in Step 710.

If the user's approach is recognized in Step 720, the table top 100 determines whether it is possible to recognize user information. If the user information is recognized in Step 730, the table top 100 displays a user approach recognition icon on the screen, as shown in FIG. 2.

On the other hand, if the user information is not recognized in Step 723, the table top 100 displays a user information input window. The table top 100 then receives the user information from the user in step 726, and displays a user approach recognition icon regarding the user on the screen with reference to the input user information.

As shown in FIG. 4, the user approach recognition icon is displayed at a different position on the screen according to a user's position. Also, as shown in FIG. 6, if the user moves from one position to another position, the table top 100 moves the user approach recognition icon according to the position to which the user has moved.

If the user information is not recognized, the table top 100 may display a guest user approach recognition icon as shown in FIG. 3 so that the user can use the table top 100 as a guest without a user authentication process.

After that, the table top 100 then determines whether the user approach recognition icon is selected in Step 740. The user may select the user approach recognition icon using a manipulating device provided on the table top 100. For example, as shown in FIG. 7, the user may select the user approach recognition icon by touching it.

If the user selects the user approach recognition icon 740, the table top 100 displays a personalized area for the user on the screen. As shown in FIG. 8, various menus are displayed on the personalized area so that the user can use the menus. Also, as shown in FIG. 9, the personalized area may move as the user moves.

The table top 100 then determines whether the user's approach recognition is terminated in Step 760. As shown in FIG. 10, if the user leaves the approach recognition area, the table top 100 determines that the user's approach recognition is terminated.

If the user's approach recognition is terminated in Step 760, the table top 100 stops displaying the personalized area in Step 770.

Through the above-described process, the table top 100 recognizes the user's approach and provides the UI for each user. In particular, since the table top 100 recognizes the user by recognizing the user's approach only, the user is able to use a personalized service without a complicated log-in process.

Figure 14:
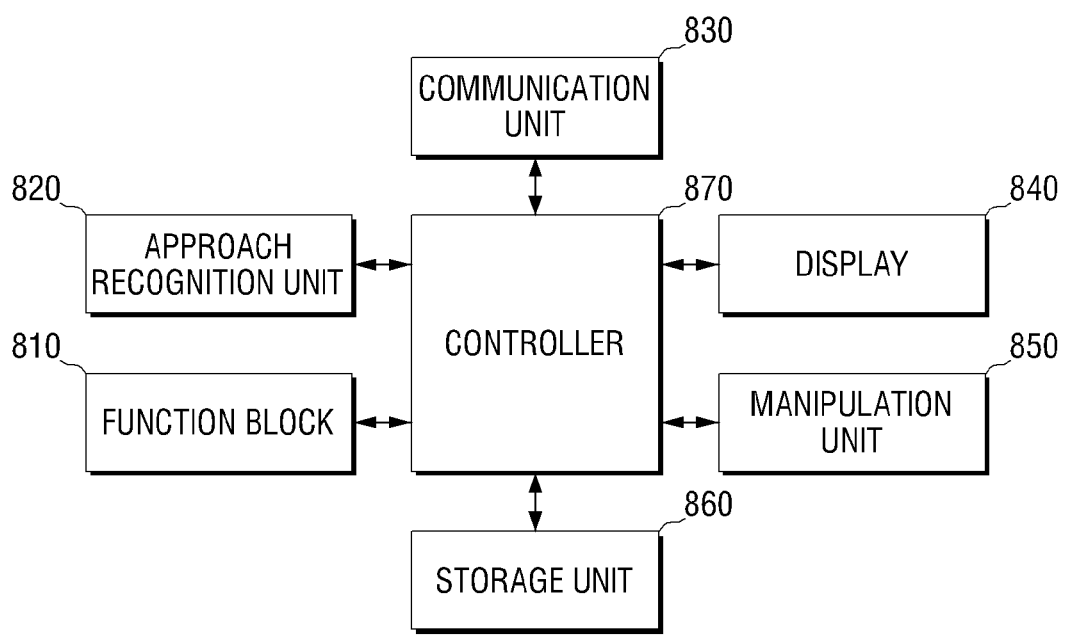
FIG. 14 is a block diagram illustrating a device according to an exemplary embodiment.

As shown in FIG. 14, the device includes a function block 810, an approach recognition unit 820, a communication unit 830, a display 840, a manipulation unit 850, a storage unit 860, and a controller 870.

The function block 810 performs an original function of the device. If the device is a table top, the function block 810 performs a table top function, and if the device is a smart board, the function block 810 performs a function of the smart board which is needed in a digital conference.

The approach recognition unit 820 recognizes whether the user approaches an approach recognition area. The approach recognition unit 820 includes at least one approach recognition sensor. The number of approach recognition sensors is different according to a type of sensor and arrangement of sensors. For example, the approach recognition unit 820 may use an ID card reader, a wireless communication module, or a biometric sensor.

The approach recognition unit 820 may recognize a direction from which the user approaches the device. The approach recognition unit 820 may recognize the approaching direction of the user using a location where the approach recognition sensor is arranged.

As described above, the device recognizes whether the user approaches and a direction from which the user approaches, using the approach recognition unit 820, as described with reference to FIG. 1.

The communication unit 830 communicates with surrounding devices by accessing a network configured along with the surrounding devices.

The display 840 displays a result of performing the function of the function block 810. Also, the display 840 displays a GUI necessary for realizing the present invention. More specifically, the display 840 displays the user approach recognition icon and the personalized area.

The manipulation unit 850 allows for inputting of user commands. For example, the manipulation unit 850 includes a touch screen and a button provided on the device.

The storage medium 860 is a storage medium that stores files, contents, and data used for performing a service. Also, the storage medium 860 stores information of a user's ID and information of a user's personalized area.

Figure 13:
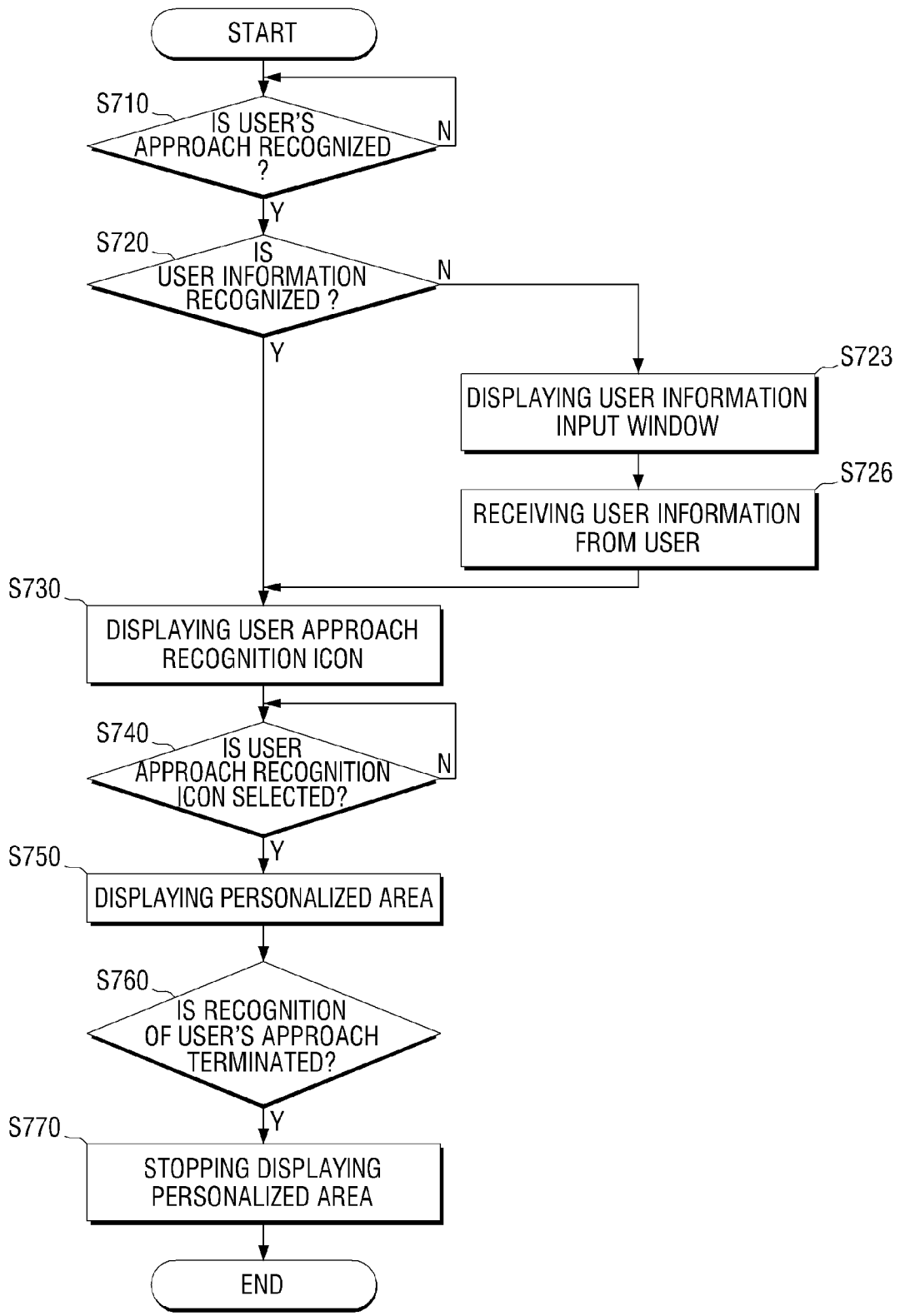
FIG. 13 is a flowchart illustrating a method for providing a UI for each user according to an exemplary embodiment.

The controller 870 performs the operations of the flowchart of FIG. 13, thereby recognizing the user's approach and displaying the personalized area.

In the above embodiment, one user uses one side of the table top 100. However, the table top 100 may recognize two or more users approaching one side, as explained with reference to FIGS. 15 and 16.

Figure 15:
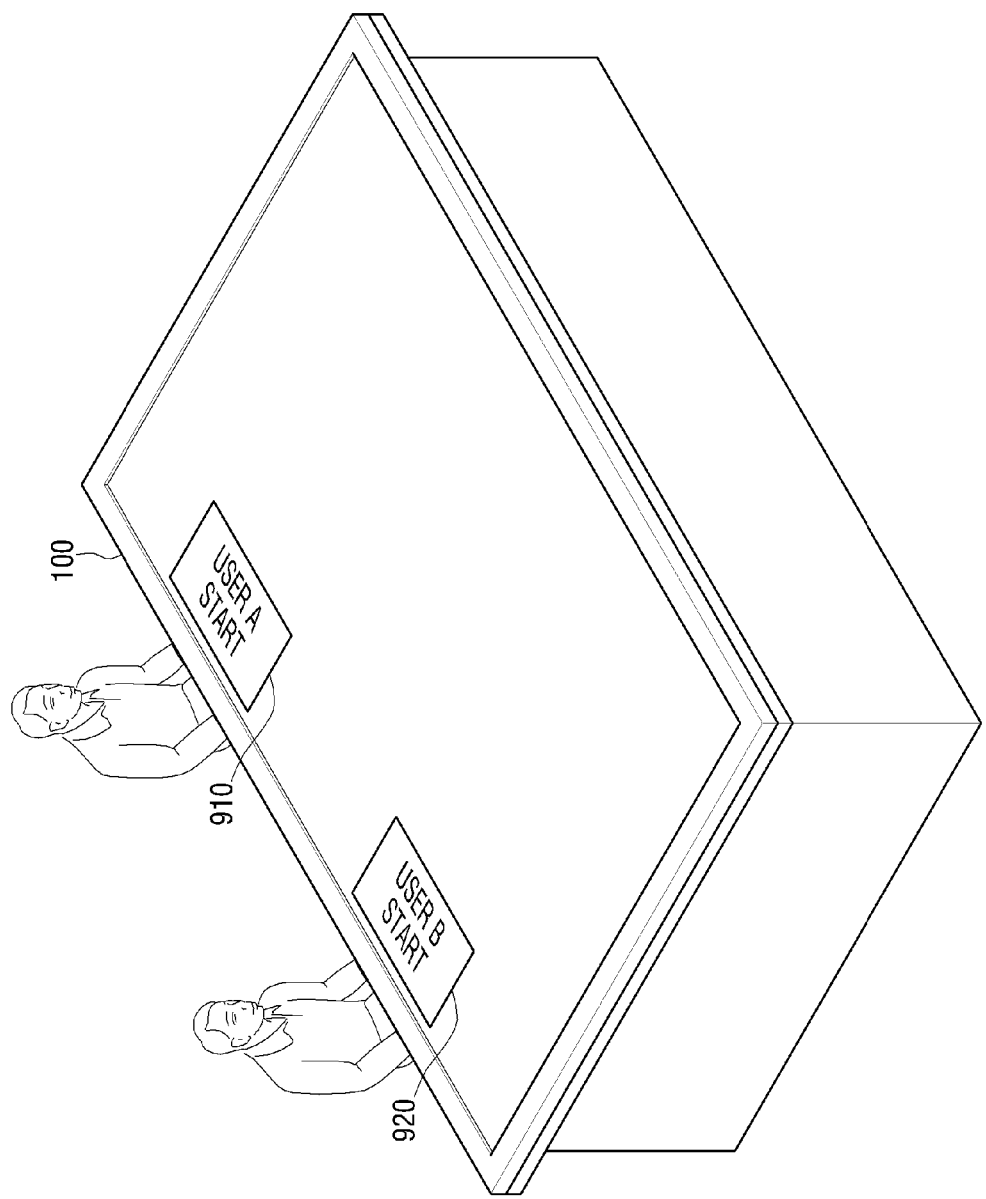
FIG. 15 is a view illustrating user approach recognition icons displayed if two users approach one side of a table top, according to an exemplary embodiment.

As shown in FIG. 15, if two users approach one side of the table top 100, the table top 100 recognize approach by two users. The table top 100 recognizes whether a plurality of users approach the approach recognition area. Recognizing approaches of the plurality of users may be performed by a single approach recognition sensor or a plurality of approach recognition sensors. For example, the table top 100 recognizes ID cards of two or more users to recognize two or more users' approaches. Also, the table top 100 may recognize the plurality of users approaching one side using a plurality of biometric sensors arranged on the one side.

The table top 100 displays an approach recognition icon for each of the two users. For example, as shown in FIG. 15, the table top 100 displays a first approach recognition icon 910 for the user 'A' and a second approach recognition icon 920 for the user 'B'.

As described above, if the two or more users approach one side, the table top 100 displays the respective approach recognition icon for each user on the screen.

Also, if two or more users approach one side, the table top 100 may display users' personalized areas on one surface, as explained with reference to FIG. 16.

Figure 16:
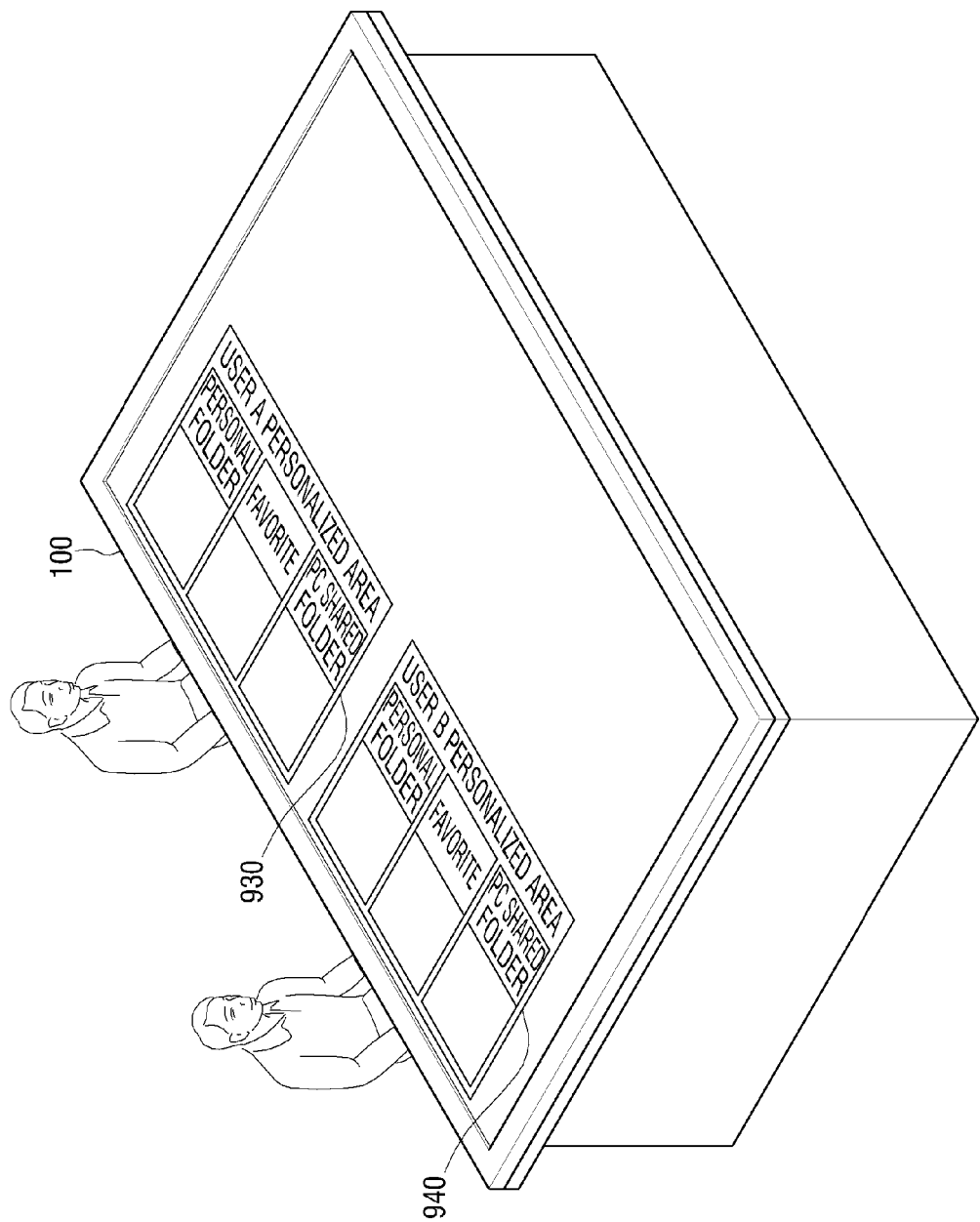
FIG. 16 is a view illustrating personalized areas displayed, if two users approach one side of a table top, according to an exemplary embodiment.

If each user of FIG. 15 touches the approach recognition icons, the table top 100 displays a personalized areas for each user on the screen, with FIG. 16 illustrating a resulting screen if the two users touch the approach recognition icons. If the two users of FIG. 15 touch the first approach recognition icon 910 and the second approach recognition icon 920, the table top 100 displays a first personalized area 930 for the user 'A' and a second personalized area 940 for the user 'B' as shown in FIG. 16. In other words, if a manipulation to select one of a plurality of approach recognition icons is input, the table top 100 displays a personalized area corresponding to the selected icon.

As described above, if two or more users approach one side, the table opt 100 displays the personalized area for each user.

As described above, the table top 100 is able to recognize the plurality of users approaching one side and provide the approach recognition icon and the personalized area for each user.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for providing a user interface for each user of a device comprising a display, the method comprising:
   detecting whether a user approaches an approach recognition area;
   if the user approaches the approach recognition area, displaying an icon indicating that the user has approached; and
   if a manipulation to select the icon is input, displaying a personalized area, which is a screen area allocated to the user,
   wherein the icon is displayed in a different position according to a direction in which the user approaches.

2. The method of claim 1, wherein the detecting comprises detecting an approaching direction of the user, while detecting whether the user approaches the approach recognition area.

3. The method of claim 2, wherein the displaying of the icon comprises displaying the icon on a screen area corresponding to the approaching direction of the user.

4. The method of claim 2, wherein the displaying of the personalized area comprises displaying the personalized area on a screen area corresponding to the approaching direction of the user.

5. The method of claim 1, wherein the detecting comprises detecting user information, while detecting whether the user approaches the approach recognition area.

6. The method of claim 5, wherein the detecting comprises detecting user information using an ID card and biometric authentication of the user.

7. The method of claim 5, wherein the user information includes at least one of a user's ID, password, name, and photo,
   wherein the displaying the icon comprises displaying at least one of the user information along with the icon.

8. The method of claim 1, further comprising, if the user moves from one position to another position, moving the icon or the personalized area on a screen according to the position to which the user has moved.

9. The method of claim 8, wherein the moving comprises moving the icon or the personalized area such that a lower end of the icon or the personalized area is oriented toward an outside of the screen when the icon or the personalized area is being moved to the position to which the user has moved.

10. The method of claim 1, further comprising, if the user moves to an external apparatus communicably connected to the device via a wired or wireless communication module, transmitting information regarding the icon or the personalized area to the external apparatus.

11. The method of claim 1, further comprising, if the detection of the user's approach is terminated while the icon or the personalized is being displayed, controlling the icon or the personalized area to disappear.

12. A device comprising:
   an approach recognition unit which detects whether a user approaches an approach recognition area;
   a manipulation unit which receives a user's manipulation;
   a display unit which displays an input image; and
   a controller which, if the user approaches the approach recognition area, controls the display unit to display an icon indicating that the user has approached, and, if a manipulation to select the icon is input through the manipulation unit, controls the display unit to display a personalized area, which is a screen area allocated to the user,
   wherein the icon is displayed in a different position according to a direction in which the user approaches.

13. A method for providing a user interface for each user of a device comprising a display, the method comprising:
   detecting whether a user approaches an approach recognition area;
   displaying a specific icon, if the user approaches the approach recognition area;
   detecting a user's movement within the approach recognition area; and
   if the user's movement is detected, moving the specific icon on a screen according to the user's movement,
   wherein the icon is displayed in a different position according to a direction in which the user approaches.

14. The method of claim 13, wherein the moving comprises moving the icon such that a lower end of the icon is oriented toward an outside of the screen while the icon is being moved according to the user's movement.

15. The method of claim 1, wherein the device comprises a plurality of surfaces,
   wherein the detecting comprises detecting whether a plurality of users approach an approach recognition area of one of the plurality of surfaces,
   wherein the displaying the icon comprises displaying a plurality of icons for the plurality of users on the screen.

16. The method of claim 15, wherein the displaying of the personalized area comprises, if a manipulation to select one of the plurality of icons is input, displaying a personalized area corresponding to the selected icon.

\* \* \* \* \*